United States Patent
Chakravarthy et al.

(10) Patent No.: US 10,827,317 B2
(45) Date of Patent: Nov. 3, 2020

(54) METHOD AND SYSTEM FOR BI-DIRECTIONAL RICH TEXT, MOBILE BROADCAST MESSAGING

(71) Applicants: Sriram Chakravarthy, Saratoga, CA (US); Madhav Vodnala, San Jose, CA (US); Ram Menon, Los Altos, CA (US); Srinivas Vinnakota, Santa Clara, CA (US)

(72) Inventors: Sriram Chakravarthy, Saratoga, CA (US); Madhav Vodnala, San Jose, CA (US); Ram Menon, Los Altos, CA (US); Srinivas Vinnakota, Santa Clara, CA (US)

(*) Notice: Subject to any disclaimer, the term of this patent is extended or adjusted under 35 U.S.C. 154(b) by 453 days.

(21) Appl. No.: 15/415,839

(22) Filed: Jan. 25, 2017

(65) Prior Publication Data

US 2017/0303101 A1  Oct. 19, 2017

Related U.S. Application Data

(60) Provisional application No. 62/286,442, filed on Jan. 25, 2016.

(51) Int. Cl.
  *H04W 4/12* (2009.01)
  *H04L 12/58* (2006.01)
  *H04W 4/06* (2009.01)

(52) U.S. Cl.
  CPC .......... *H04W 4/12* (2013.01); *H04L 51/046* (2013.01); *H04L 51/22* (2013.01); *H04L 51/10* (2013.01); *H04L 51/18* (2013.01); *H04W 4/06* (2013.01)

(58) Field of Classification Search
  CPC ........... H04W 4/12; H04W 4/06; H04W 4/08; H04L 51/22; H04L 29/12292; H04L 51/28; H04L 51/38; H04L 61/2069; H04L 51/18; H04L 65/605; H04L 29/06027; H04L 51/063; G06Q 10/107; G06Q 10/10; H04M 1/72552; H04M 1/72547; Y10S 707/99933; Y10S 707/99934; Y10S 707/99932
  USPC ........................................ 709/206
  See application file for complete search history.

(56) References Cited

U.S. PATENT DOCUMENTS

| | | | |
|---|---|---|---|
| 2007/0150484 A1* | 6/2007 | Funge | G06F 16/51 |
| 2009/0037545 A1* | 2/2009 | Li | G06Q 10/10 709/206 |
| 2009/0061825 A1* | 3/2009 | Neelakantan | H04L 29/12292 455/412.1 |

(Continued)

*Primary Examiner* — Tan Doan

(57) ABSTRACT

In one aspect, a computerized method generating and managing a set of broadcast-application messages includes the step of providing a dashboard view that enables the creation of a broadcast-application message creation. The computerized method includes the step of receiving a user addressee instruction. The computerized method includes the step of receive a user reply instruction. The computerized method includes the step of receiving a rich-media content card with a set of broadcast-application message creation instructions. The computerized method includes the step of receiving, with the dashboard view, an aggregation of reply instructions. The computerized method includes the step of generating the broadcast application message generated using a set of tools presented by the dashboard view. The computerized method includes the step of communicating the broadcast application message to a designated addressee.

1 Claim, 11 Drawing Sheets

(56) References Cited

U.S. PATENT DOCUMENTS

| | | | |
|---|---|---|---|
| 2010/0107044 A1* | 4/2010 | Li | H04M 1/72552 715/201 |
| 2011/0214046 A1* | 9/2011 | Haberman | G06Q 10/107 715/202 |
| 2014/0267553 A1* | 9/2014 | Lo | H04M 3/567 348/14.07 |

* cited by examiner

METHOD AND SYSTEM FOR BI-DIRECTIONAL RICH TEXT, MOBILE BROADCAST MESSAGING

CROSS-REFERENCE TO RELATED APPLICATIONS

This application claims priority to U.S. Provisional Application No. 62/286,442, titled and METHOD AND SYSTEM FOR BI-DIRECTIONAL RICH TEXT, MOBILE BROADCAST MESSAGING filed on Jan. 25, 2016. This provisional application is incorporated by reference in its entirety.

BACKGROUND

1. Field

This application relates generally to electronic messages, and more specifically to a system, article of manufacture and method for bi-directional rich text, mobile broadcast messaging.

2. Related Art

A significant rise of messaging in mobile from a consumer standpoint is occurring. It is noted that usage of messaging in an enterprise context can be different. For example, messaging can be closely tied with the corporate business applications. Accordingly, improvements in a simple reply-request mobile messaging paradigm can be applied to retrieve information from business applications.

BRIEF SUMMARY OF THE INVENTION

In one aspect, a computerized method generating and managing a set of broadcast-application messages includes the step of providing a dashboard view that enables the creation of a broadcast-application message creation. The computerized method includes the step of receiving a user addressee instruction. The computerized method includes the step of receive a user reply instruction. The computerized method includes the step of receiving a rich-media content card with a set of broadcast-application message creation instructions. The computerized method includes the step of receiving, with the dashboard view, an aggregation of reply instructions. The computerized method includes the step of generating the broadcast application message generated using a set of tools presented by the dashboard view. The computerized method includes the step of communicating the broadcast application message to a designated addressee.

Optionally, the broadcast-application message comprises a text message. The text message comprises a multimedia system message (MMS). The rich-media content comprises a combination of a video file, digital image file, a hyperlink, forms, and one or more metadata instructions. The broadcast-application message is addressed to a plurality of addressees. The metadata instructions provide instructions for aggregating a reply by the addressee of the broadcast-application message with a set of replies from the plurality of addressees into a set of aggregated replies. The set of aggregated replies are parsed and a set of content of the aggregated replies is rendered for display on the dashboard view. The broadcast-application message includes a poll question. The set of aggregated replies comprises a set of responses to the poll question. A user formats the visual layout of the rich-media content card using the dashboard view.

Figure 1:
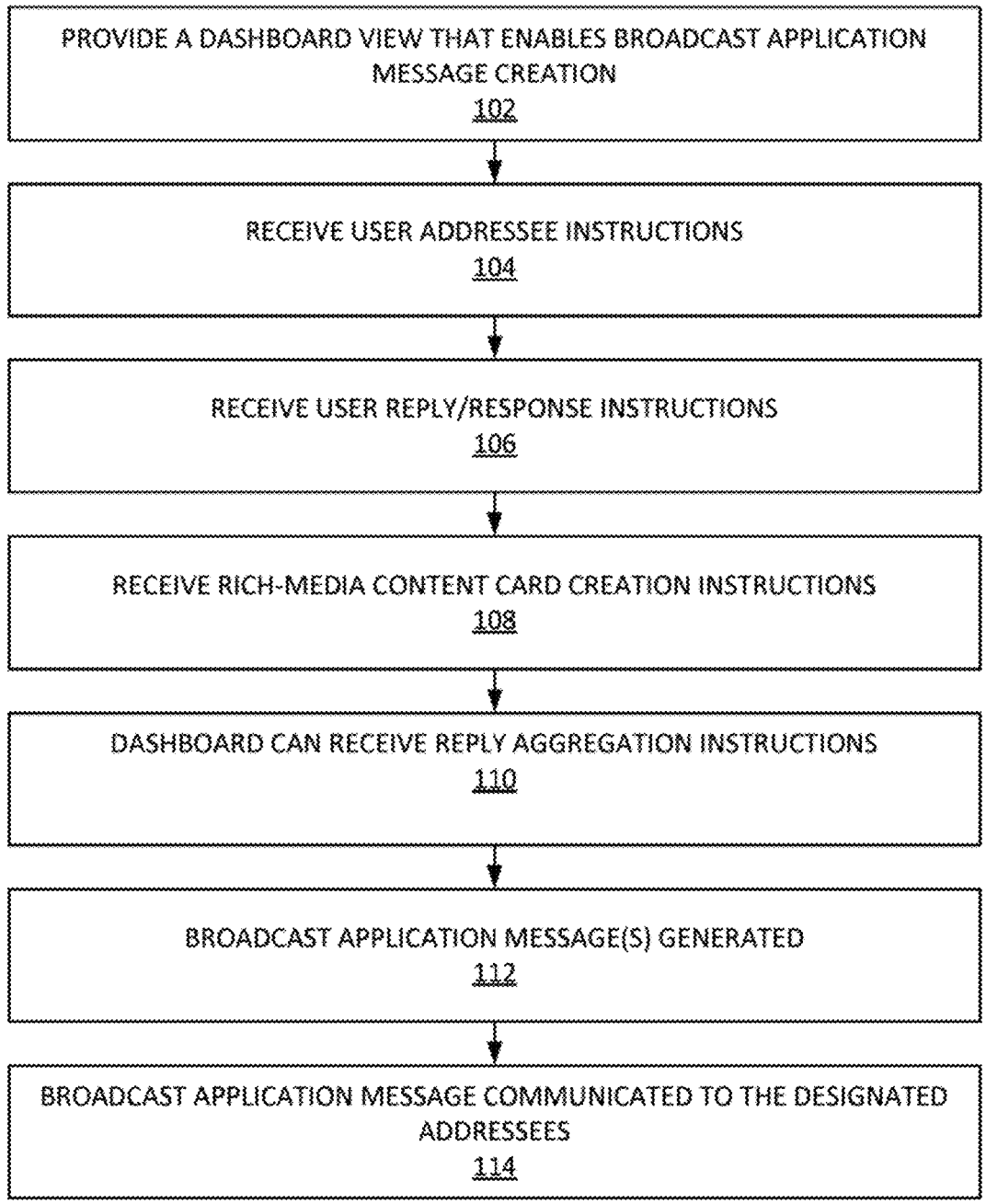
FIG. 1 illustrates an example process of generating an application broadcast message, according to some embodiments.

The Figures described above are a representative set, and are not an exhaustive with respect to embodying the invention.

DESCRIPTION

Disclosed are a system, method, and article of bi-directional rich text, mobile broadcast messaging. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application messages (e.g. text messages and/or electronic massages) can be between two or more mobile device and/or fixed over a phone network, a cellular network and/or a computer network (e.g. the Internet). Example application messages include, inter alia: Short Message Service (SMS), Multimedia Messaging Service, instant messaging, online social network messages, microblogging, an in-application message, bulk text messages, and/or other standards of telephone/cellular/computer network messaging.

Application programming interface (API) can specify how software components of various systems interact with each other.

Cloud computing can involve deploying groups of remote servers and/or software networks that allow centralized data storage and online access to computer services or resources. These groups of remote serves and/or software networks can be a collection of remote computing services.

Dashboard can be a webpage, application page or other user interface that, inter alia, collates information and enables a user to interact with said information to create application broadcast messages, form templates, survey templates, digital information presentations (e.g. in a slideshow format, etc.), digital information summaries, data management operations, database queries, Internet access, etc.

Mobile device can be a smart phone, tablet computer, wearable computer (e.g. a smart watch, a head-mounted display computing system, etc.). In one example, a mobile device can be a small computing device, typically small enough to be handheld having a display screen with touch input and/or a miniature keyboard.

Natural language processing (NLP) is a field of computer science, artificial intelligence, and computational linguistics concerned with the interactions between computers and human (natural) languages.

Exemplary Methods

FIG. 1 illustrates an example process 100 of generating an application broadcast message, according to some embodiments. As used herein, an application broadcast message can be a text message (e.g. a short-messaging service (SMS) type message, a multimedia service message (MMS), etc.) that can include rich-media content. Rich content can include video files, digital image files, hyperlinks, forms, metadata instructions, etc. In some embodiments, process 100 can use a proprietary protocol to push these rich broadcast messages to the mobile phones its not going via SMS or email or any other protocol.

Process 100 can implement the following broadcast communication operations. Process 100 can read receipts. Process 100 broadcasts can have inherent traceability. As a result, each action on the card, including reading the card, is recorded on the server. All this information is instantly available (e.g. assuming processing and networking latencies, etc.) on the dashboard because the read-receipts are aggregated in real-time.

Process 100 can broadcast with specific reply-to's. For example, the broadcasts (e.g. of a batch of broadcast application messages, etc.) can be sent to a large group of users (e.g. a thousand user, etc.) but any replies to these broadcasts can be limited to a select set of users (e.g. ten users, etc.). For example, they can be sent to a large group of users with a specific "reply-to" set of users. The 'reply-to' functionality can specify the reply is sent to the sender and/or another specified recipient (e.g. a supervisor, a set of company executives, etc.). This not only avoids the dreadful reply-to all scenarios but also allows for a specific set of users to receive questions and clarifications about the broadcast and respond to them.

Process 100 can implement broadcasts that are bi-directional with aggregated replies. For example, broadcasts can be constructed as a form or poll so that they can also be used to retrieve responses back from the user who receives these broadcast. Replies from these broadcasts are also intelligently aggregated by the platform so that the user can see the replies all aggregated into a single view. For instance, if a poll or a request for comment is sent to 100 users, the replies from each user is aggregated together so the user see all the replies in one place.

Process 100 can implement targeted broadcasts lists. A broadcast manager allows for the selection of specific set of users to be sent the broadcast messages to. This broadcast list can be created using the user's phone number, email and any other type of filter like location, address, group name, department etc. This can enable fain-grained targeting of users who will receive this broadcast. The target recipient of the broadcast list does not need to have a proprietary application installed on his/her mobile device. Users who are targets of a broadcast and they have not installed a proprietary application (e.g. an Avaamo® messaging application, etc.), these broadcast can be sent as email or SMS messages.

Process 100 can implement rich content in messages. The broadcast cards can have rich content embedded in them, this can include, inter alia, images, links, videos, documents and any other form of attachment. Process 100 can intelligently handle large attachments and delivers them over slow connections as well.

Process 100 can implement embedded analytics. For example, broadcast cards can have embedded analytics, such that a user who sends out these cards can quickly view who these cards has been sent to, who has seen them and who has responded to them and the associated responses.

Process 100 can implement export broadcast data. For example, replies and aggregated data associated with a broadcast card can be exported into a standard data format.

For example, CSV for external systems/applications to consume. Replies and aggregated data can also be directly sent into external systems such as CRM, ERP, or HR systems in real-time or periodically without any admin action.

Process 100 can implement reminders. For example, process 100 can provide action button to automatically remind users who have not read a broadcast.

Figure 2:
FIGS. 2-6 illustrate example screen shots of example application broadcast messages that include rich-media content, according to some embodiments.
Figure 3:
Figure 4:
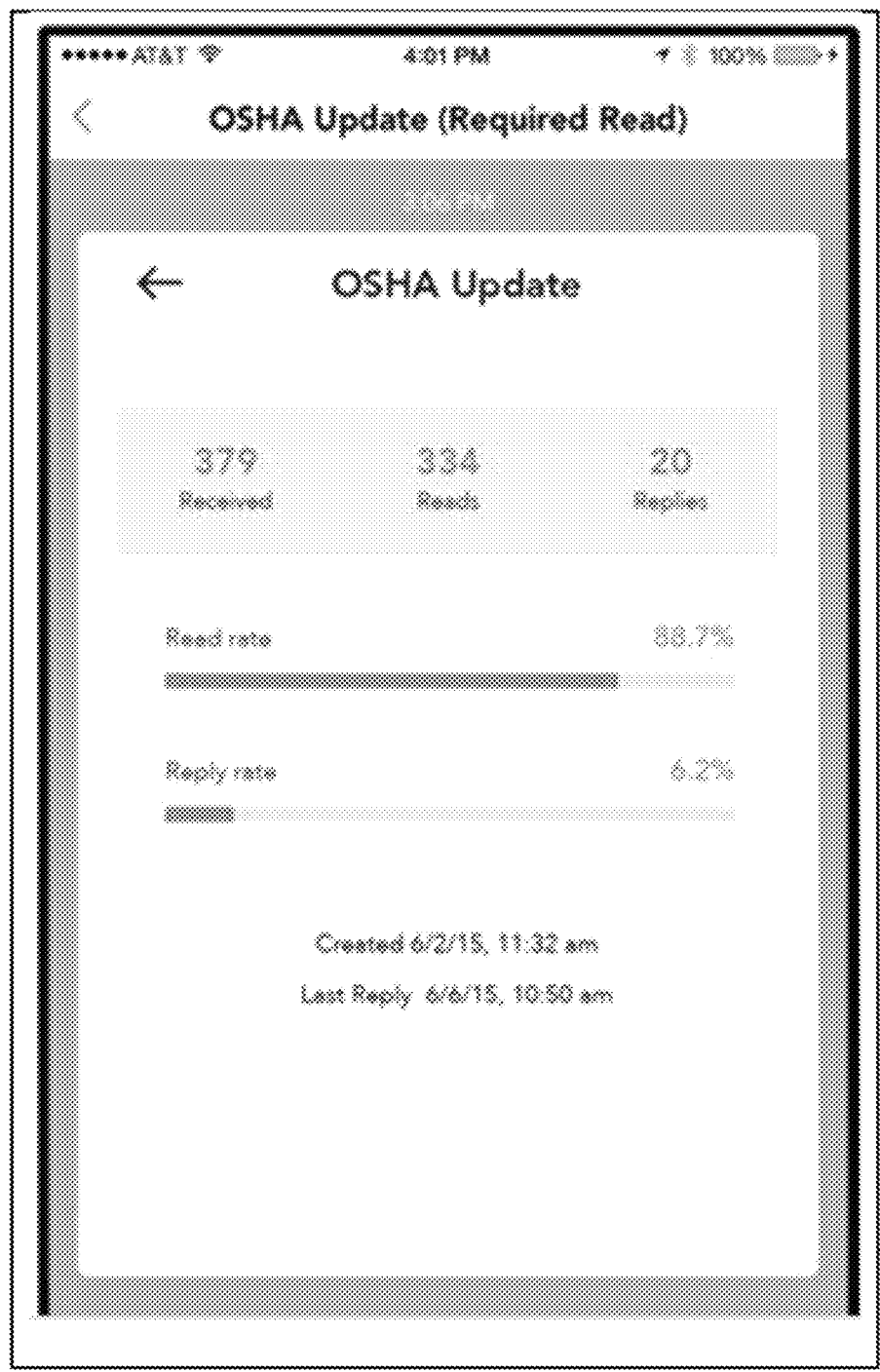
Figure 5:
Figure 6:
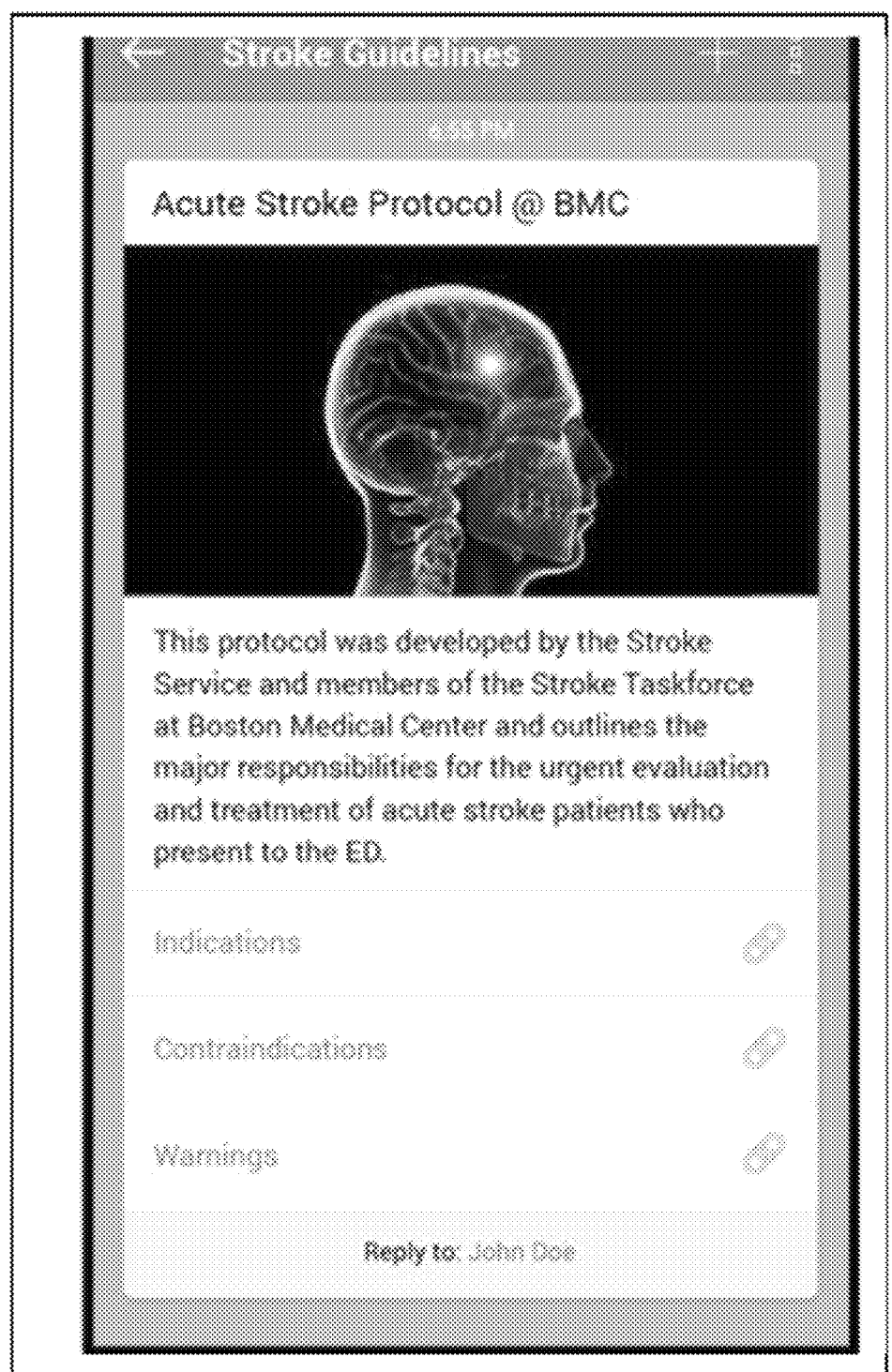

FIGS. 2-6 illustrate example screen shots of example application broadcast messages that include rich-media content, according to some embodiments. Rich-media content cards can be included in the content-rich message as shown. As shown, application broadcast messages can be composed for various industries, subject matters and the like. FIG. 2 illustrates an ample screen shot 200 of example application broadcast messages that include rich-media content, according to some embodiments. FIG. 3 illustrates an example screen shot 300 of example application broadcast messages that include rich-media content, according to some embodiments. FIG. 4 illustrates an example screen shot 400 of example application broadcast messages that include rich-media content, according to some embodiments. FIG. 5 illustrates an example screen shot 500 of example application broadcast messages that include rich-media content, according to some embodiments. FIG. 6 illustrates an example screen shot 600 of example application broadcast messages that include rich-media content, according to some embodiments.

Figure 7:
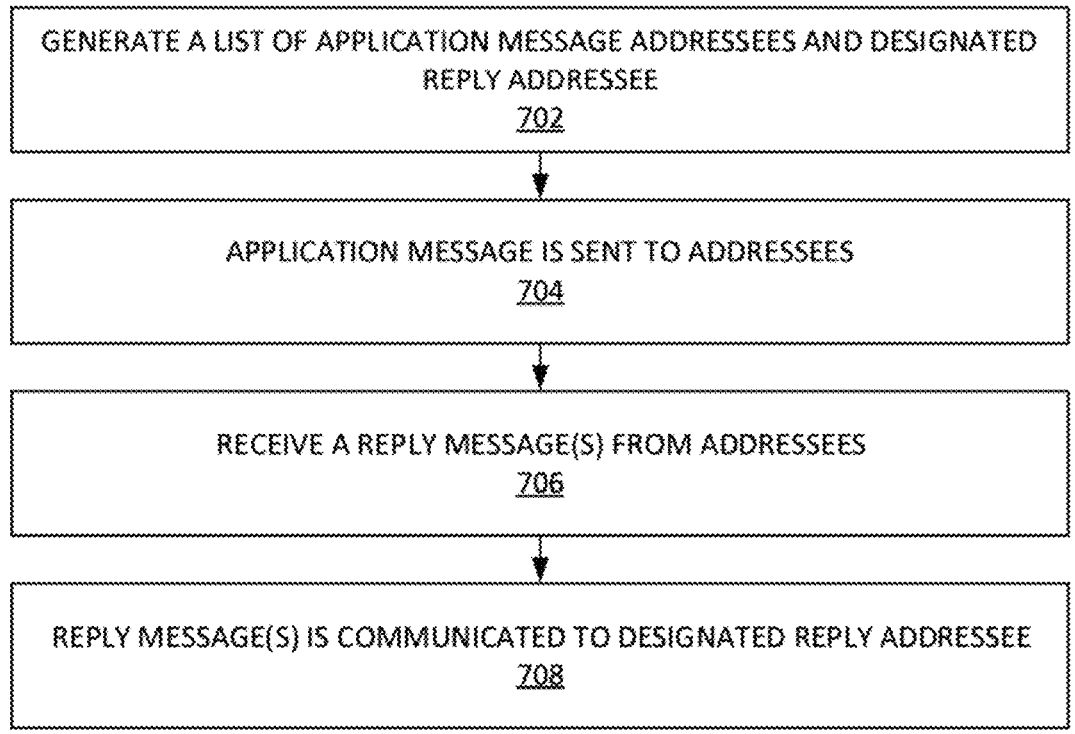
FIG. 7 illustrates a process of designating one or more recipients for a bulk application message, according to some embodiments.
Figure 8:
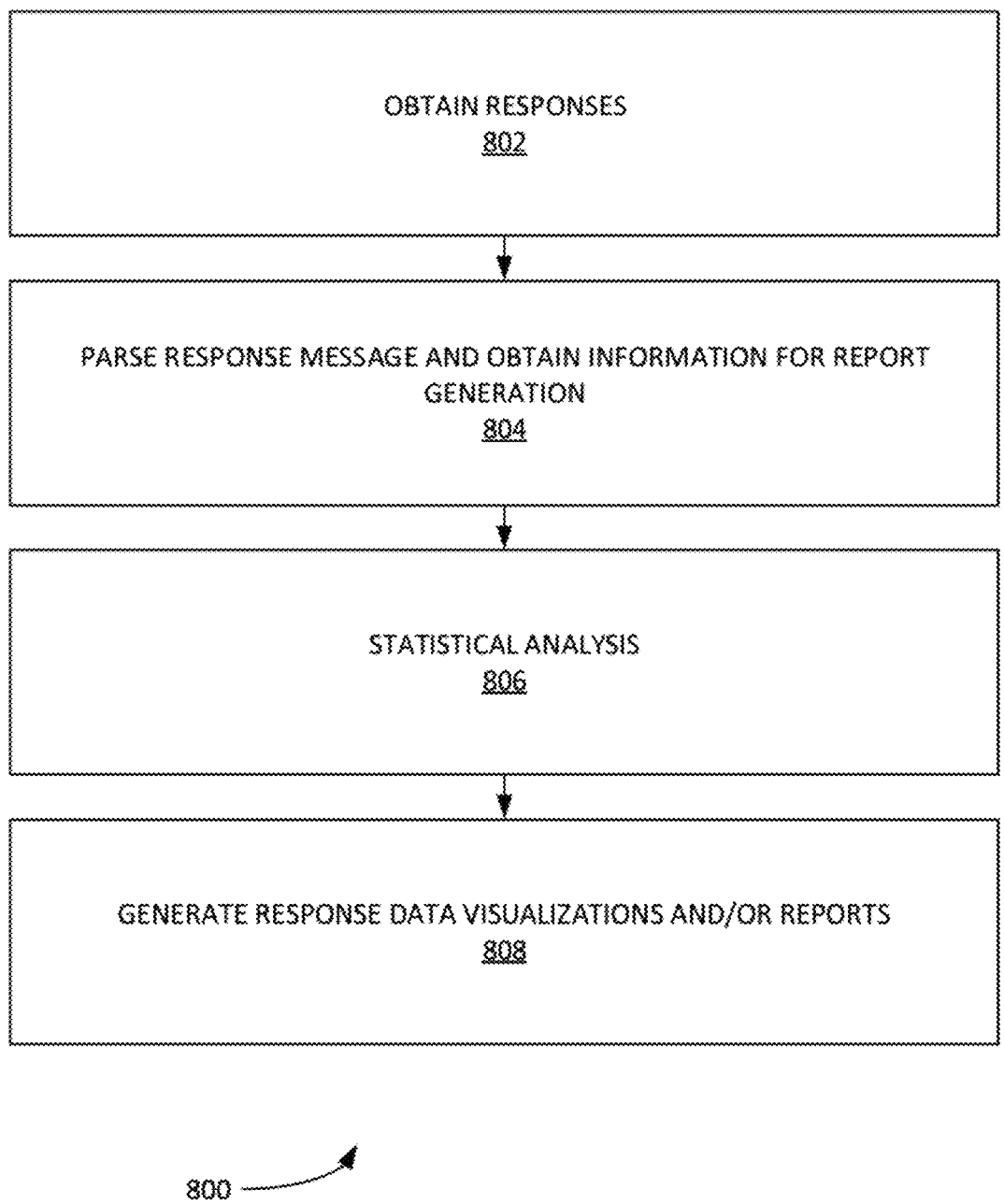
FIG. 8 illustrates an example process for aggregating reply message information, according to some embodiments.

Returning to process 100, in step 102, process 100 can provide, a dashboard view that enables application broadcast message creation. For example, rich-media content can be selected for inclusion into the application broadcast message. Forms templates can be selected and forms can be organized for inclusion in the application broadcast message. A list of potential application broadcast message addressees can be provided. Reply instructions can be input and/or selected from a list of provided options. The dashboard can include various user input icons and/or elements (e.g. text input, radio button, check box buttons, drag and drop options, etc.). FIGS. 7 and 8 of U.S. Provisional Application No. 62/286,442 filed on 25 Jan. 2016 and incorporated herein by reference illustrate an example screenshot of a dashboard providing a visual composer of application broadcast messages, according to some embodiments.

In step 104 of process 100, the dashboard can receive user addressee instructions. A user can parse various enterprise employees by various attributes (e.g. job title, management/supervisor status, name, project associations, responsibilities, demographic attributes, employment length, benefits associations, third-party associations, etc.). Third parties can also be selected. For example, contract entities can be selected and/or input. Accordingly, various employees and other entities can be designated as addressees for specified application broadcast messages. In some examples, subsets of designated addressees can be selected to receive additional text, rich-media content or other information. In some examples, subsets of designated addressees can be selected to not receive additional text, rich-media content or other information. In this way, the user can parse the various sets of addressees and control the content and other options (e.g. reply options) of the application broadcast messages as a group and/or granular level.

In step 106 of process 100, the dashboard can receive user reply/response instructions. A user can designate the response addressee of any responses/replies to the application broadcast messages. More than one response addressee can be selected.

In step 108 of process 100, the dashboard can receive rich-media content card creation instructions. For example, a user can format the visual layout of the rich-media content card. The user can select/input the text, rich-media content, forms, etc. to be included in the application broadcast message.

Figure 9:
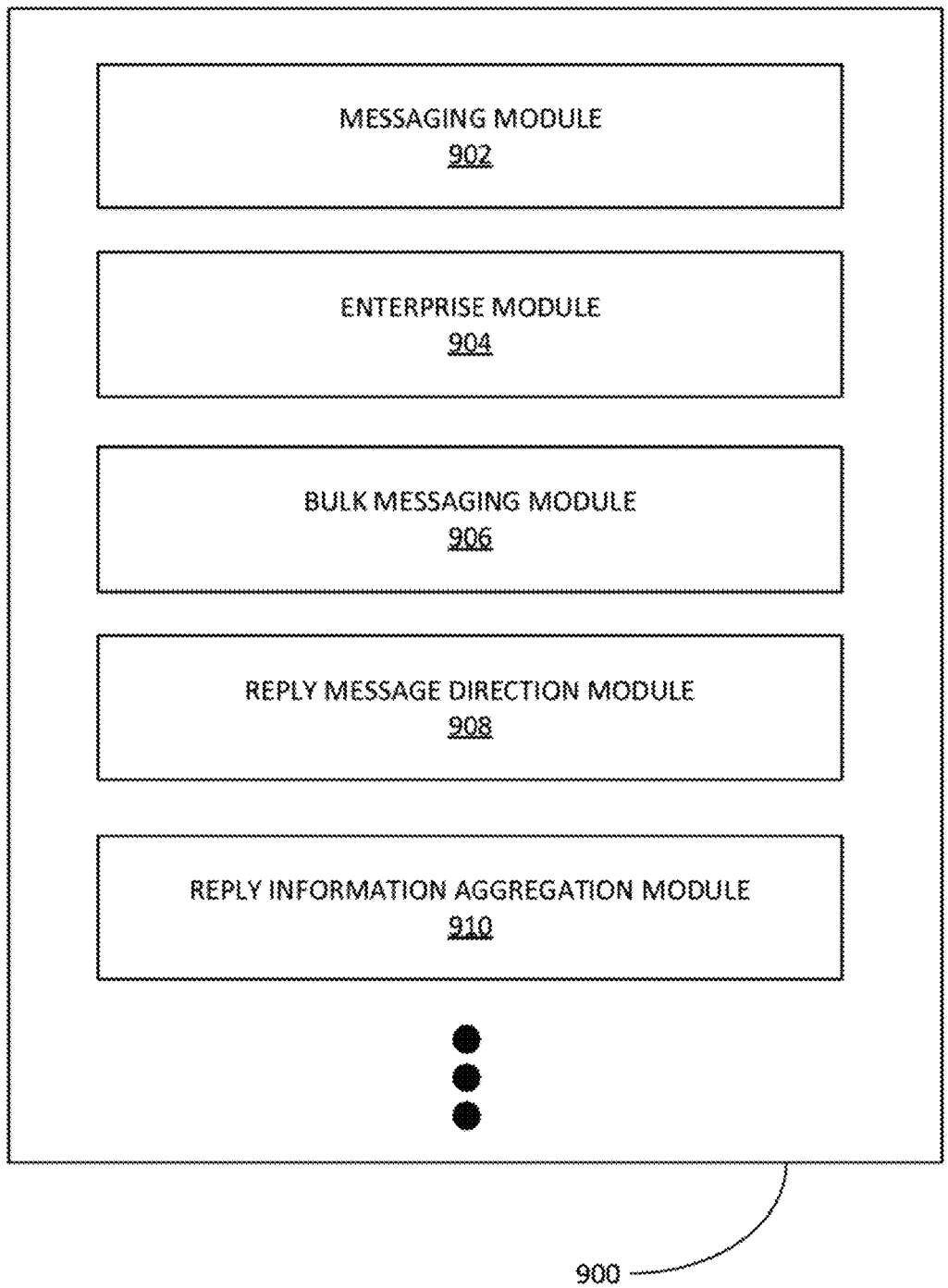
FIG. 9 illustrates, in block diagram format, an example application broadcast message server, according to some embodiments.
Figure 10:
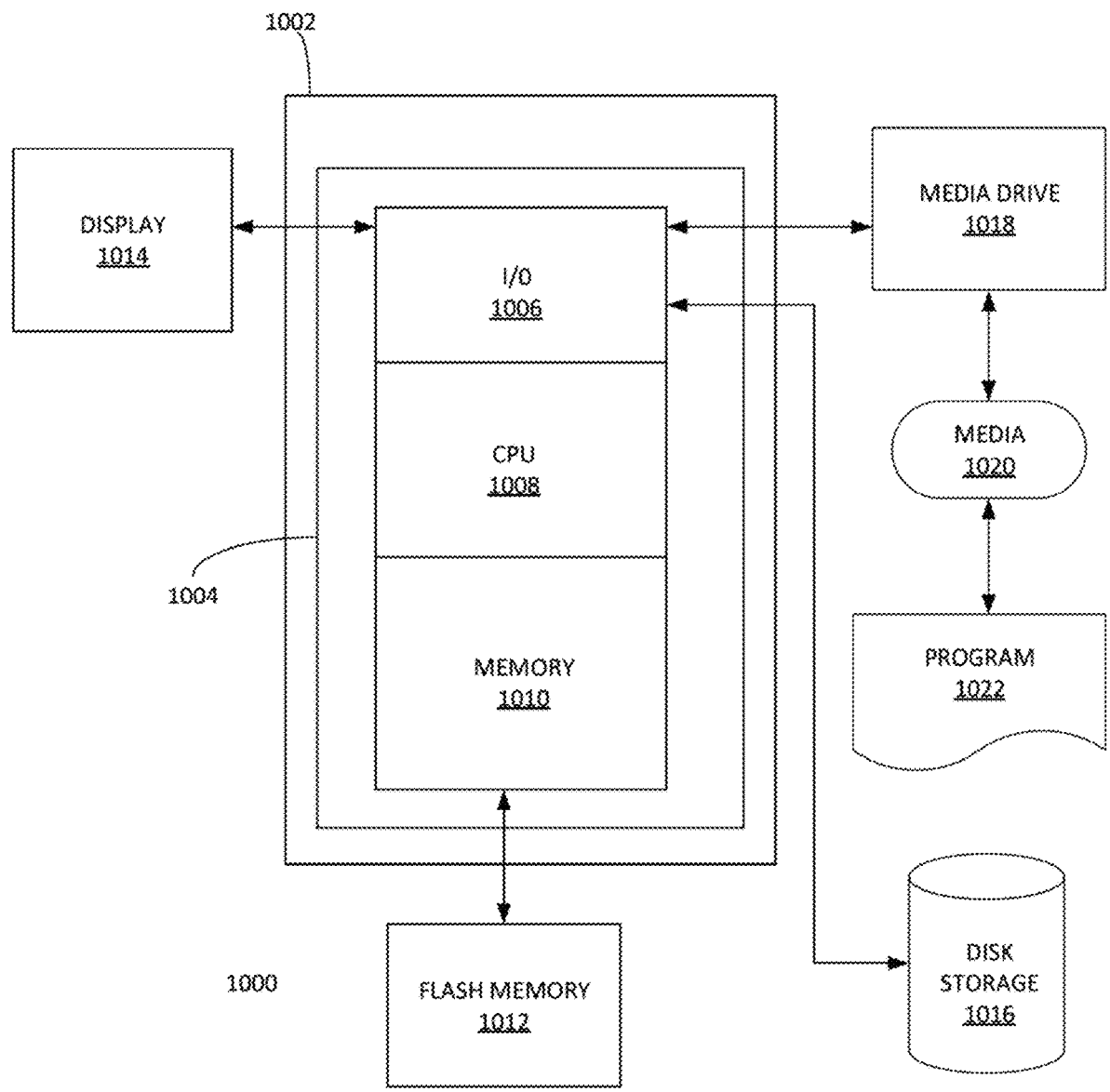
FIG. 10 depicts an exemplary computing system that can be configured to perform any one of the processes provided herein.

In step 110 of process 100, the dashboard can receive reply aggregation instructions. Addressees can reply/respond to a broadcast message. Information in these responses can be aggregated into summaries (e.g. using various statistical methods). Various data displays of the aggregated information can be selected/provided by the user. FIGS. 9 and 10 of U.S. Provisional Application No. 62/286,442 filed on Jan. 25, 2016 (incorporated herein by reference) illustrate example aggregation cards that can be used for receiving replies and/or aggregating them from recipients, according to some embodiments. Information can be aggregated from addressee completed forms, surveys, etc.

Figure 11:
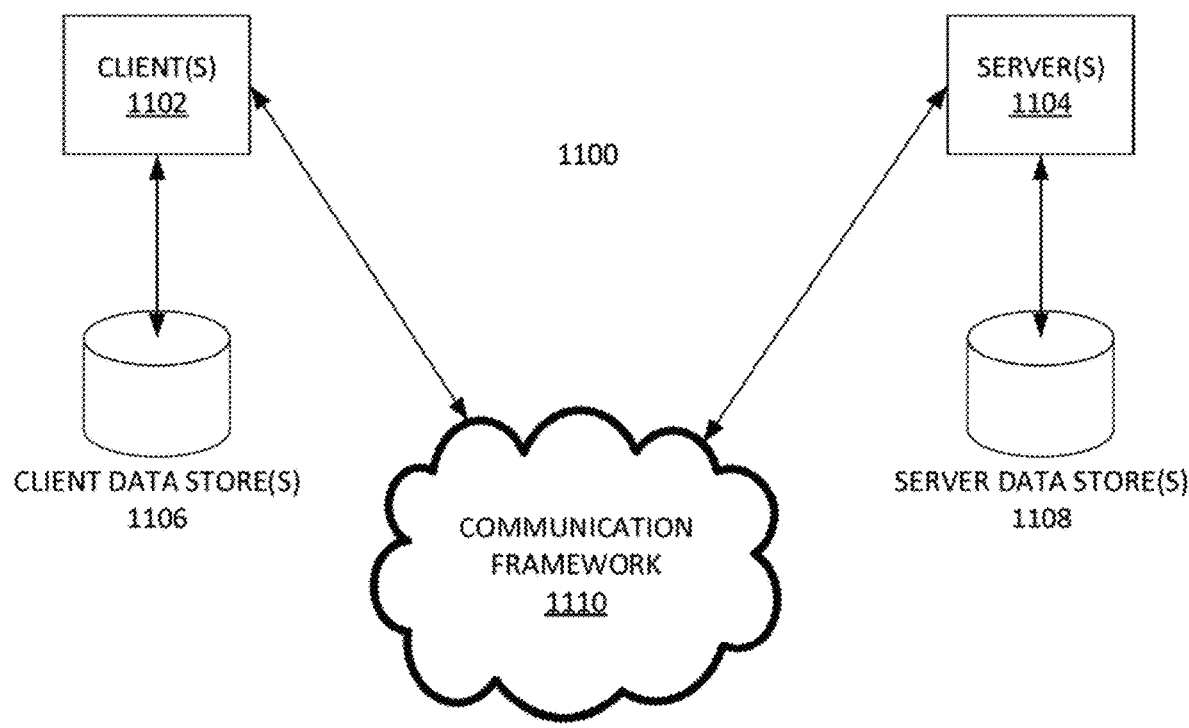
FIG. 11 is a block diagram of a sample-computing environment that can be utilized to implement various embodiments.

In step 112 of process 100, an application broadcast message(s) can be, generated. For example, the information obtained from steps 102-110 can be used to generate the application broadcast message. FIG. 11 of U.S. Provisional Application No. 62/286,442 filed on Jan. 25, 2016 illustrates example application broadcast messages that can be generated by process 100, according to some embodiments. Application broadcast messages can be formatted for communication across various computer (e.g. the Internet), cellular and/or text messaging networks. In step 114, the application broadcast message can be communicated to the designated addressees.

It is noted that process 100 can be provided by a broadcast manager and composer implemented in a computing system (e.g. see FIG. 9 infra). Instructions to implement process 100 (and the other processes provided herein) can be stored in a computer memory and performed by one or more processors.

FIG. 7 illustrates a process 700 of designating one or more recipients for a bulk application message, according to some embodiments. Process 700 can provide an extension of bulk messaging wherein a recipient can respond to designated recipient (i.e. entity that receives responses from bulk message recipients) associated with a sending entity. In one example, an application messaging service can provide a web interface that enables a user to implement process 700 (e.g. an administrator can filter and select specified users by location, region, department (e.g. department id, a specified call center, etc.), demographics, employments status/rank/description, and the like. In step 702, a list of application message addressees and designated reply addressee is generated. In step 704, an application message (e.g. an application broadcast) is sent to addressees. In step 706, a reply message(s) from addressees is received. In step 708, a reply message(s) is communicated to designated reply addressee. In some examples, the responses/replies can be in a one-to-one and/or one-to specified group (e.g. subset of users designated to respond) format. Process 700 can also optionally include a step (not shown) that sends a confirmation message to the designated recipient that the message was opened/viewed by the receiving user(s).

Process 700 can be extended to include bulk-message recipients that are external the enterprise using the application message system or other system that uses proprietary messaging applications. For example, the entity can send out the bulk message in a variety of electronic message formats (e.g. email, SMS, MMS, etc.). The responses can be received by the application message server.

Natural language processing algorithms and machine learning systems ran be used to parse (responses go to a general mailbox where the headers can be parsed, etc.), index and classify the responses from the bulk-message recipients. In this way, the responses (e.g. in email, SMS formats) are returned to the application message server and translated into the appropriate in-application messaging format. The in-application messages can then be forwarded to the designated recipient to responses from bulk messages. Process 100 can be extended to include online social-networking messages. For example, microblog posts and/or other online social-networking messages (e.g. Facebook® messages, LinkedIn® messages, etc.) addressed to an entity can be rerouted as in-application messages to a specified person within the entity.

FIG. 8 illustrates an example process 800 for aggregating reply message information, according to some embodiments. In step 802, process 800 can obtain the response message(s). In step 804, process 800 can parse response message and obtain information for report generation. In step 806, process 800 can implement statistical analysis on the information. In step 808, process 800 can generate various response data visualizations and/or reports.

Example Computing Systems

FIG. 9 illustrates, in block diagram format, an example application broadcast message server 900, according to some embodiments. Application broadcast message server 900 can include various server-side functionalities for implementing process 100, 700 and/or 800. Application broadcast message server 900 can include a messaging module 902. Messaging module 902 can manage the generation, communication and storage of application broadcast messages. Messaging module 902 can provide and manage a dashboard (e.g. a web display, an application display on a mobile device, etc.) to a user for generating bulk messages and/or designated who will receive responses to bulk messages. Enterprise module 904 can provide enterprise information such as, inter alia: employee data, customer data, project data, consultant data, supervisor data, hyperlinks used in application broadcast messages, etc. Bulk messaging module 906 can manage various bulk messaging applications (e.g. application broadcast messages). Reply message direction module 908 can parse incoming responses/replies to bulk messages and direct said responses to the appropriate recipients. These messages can then be forwarded as application messages to appropriate application message system users.

Reply information aggregation module 910 can extract information from incoming replies. Reply information aggregation module 910 can statistically analyze information extracted from incoming replies. Reply information aggregation module 910 can summarize said extracted information. Reply information aggregation module 910 can generate graphical displays of the summaries of information. Reply information aggregation module 910 can manage the presentation of to an enterprise administrator or other entity.

Additionally, application broadcast message server 900 can include other functionalities such as web servers, SMS servers (and external applications that connects to a Short Message Service Center (SMSC) to engage in the sending and/or receiving of SMS messages), MMS servers (and external applications that connects to a Multimedia Message Service Center (MMSC) to engage in the sending and/or receiving of MMS messages), IM servers, database managers, databases, email servers, natural language processing modules, machine-learning modules, linear regression modules, geo-location modules, application programming interfaces, etc.

FIG. 10 is a block diagram of a sample-computing environment 1000 that can be utilized to implement various embodiments. The system 1000 further illustrates a system that includes one or more client(s) 1002. The client(s) 1002 can be hardware and/or software (e.g., threads, processes, computing devices). The system 1000 also includes one or more server(s) 1004. The server(s) 1004 can also be hardware and/or software (e.g., threads, processes, computing devices). One possible communication between a client 1002 and a server 1004 may be in the form of a data packet adapted to be transmitted between two or more computer processes. The system 1000 includes a communication framework 1010 that cap be employed to facilitate communications between the client(s) 1002 and the server(s) 1004. The client(s) 1002 are connected to one or more client data stores) 1006 that can be employed to store information local to the client(s) 1002. Similarly, the server(s) 1004 are connected to one or more server data store(s) 1008 that can be employed to store information local to the server(s) 1004. In some embodiments, system 1000 can instead be a collection of remote computing services constituting a cloud-computing platform.

FIG. 11 depicts an exemplary computing system 1100 that can be configured to perform any one of the processes provided herein. In this context, computing system 1100 may include, for example, a processor, memory, storage, and I/O devices (e.g., monitor, keyboard, disk drive, Internet connection, etc.). However, computing system 1100 may include circuitry or other specialized hardware for carrying out some or all aspects of the processes. In some operational settings, computing system 1100 may be configured as a system that includes one or more units, each of which is configured to carry out some aspects of the processes either in software, hardware or some combination thereof.

FIG. 11 depicts computing system 1100 with a number of components that may be used to perform any of the processes described herein. The main system 1102 includes a motherboard 1104 having an I/O section 1106, one or more central processing units (CPU) 1108, and a memory section 1110, which may have a flash memory card 1112 related to it. The I/O section 1105 can be connected to a display 1114, a keyboard and/or other user input (not shown) a disk storage unit 1116, and a media drive unit 1118. The media drive unit 1118 can read/write a computer-readable medium 1120, which can contain programs 1122 and/or data. Computing system 1100 can include a web browser. Moreover, it is noted that computing system 1100 can be configured to include additional systems in order to fulfill various functionalities. Computing system 1100 can communicate with other computing devices based on various computer communication protocols such a Wi-Fi, Bluetooth (and/or other standards for exchanging data over short distances includes those using short-wavelength radio transmissions), USB, Ethernet, cellular, an ultrasonic local area communication protocol, etc. In some example embodiments, system 900 and processes 100, 700 and 800 can be implemented with systems 1000 and 1100.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware firmware, and software (e.g. embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense, in some embodiments, the machine-readable medium can be a non-transitory form of machine-readable medium.

What is claimed as new and desired to be protected by Letters Patent of the United States is:

1. A computerized method generating and managing a set of broadcast-application messages comprising;
    providing a dashboard view that enables the creation of a broadcast-application message creation;
    receiving a user addressee instruction;
    receive a user reply instruction;
    receiving a rich-media content card with a set of broadcast-application message creation instructions, wherein a broadcast-application message comprises a text message, wherein the text message comprises a multimedia system message (MMS), wherein the rich-media content card comprises a combination of a video file, digital image file, a hyperlink, forms, and one or more metadata instructions, wherein the metadata instructions provide instructions for automatically aggregating a reply by an addressee of the broadcast-application message with a set of replies from the plurality of other addressees into a set of automatically aggregated replies, wherein the set of automatically aggregated replies are parsed and a set of content of the automatically aggregated replies is rendered for display on the dashboard view, and wherein the broadcast-application message is addressed to the plurality of addressees;
    receiving, with the dashboard view, an aggregation of reply instructions;
    generating the broadcast application message generated using a set of tools presented by the dashboard view;
    communicating the broadcast application message to the plurality of addressees,
    wherein a user formats the visual layout of the rich-media content card using the dashboard view,
    wherein a rich-media content card template is used to organize an inclusion of the rich-media content card in the application broadcast message,
    wherein the broadcast-application message includes a poll question, and
    wherein the set of automatically aggregated replies comprises a set of responses from the plurality of addressees to the poll question.

* * * * *